(12) United States Patent
Schutte et al.

(10) Patent No.: US 8,323,594 B2
(45) Date of Patent: Dec. 4, 2012

(54) METHOD OF MAKING HYBRID ORGANIC-INORGANIC MONOMERIC MATERIALS

(75) Inventors: Henk Schutte, Amersfoort (NL); Mark Hempenius, Hengelo (NL); Gyula Julius Vancso, Enschede (NL)

(73) Assignee: Sparkxis B.V., Naarden (NL)

( * ) Notice: Subject to any disclaimer, the term of this patent is extended or adjusted under 35 U.S.C. 154(b) by 822 days.

(21) Appl. No.: 12/161,169

(22) PCT Filed: Jan. 18, 2007

(86) PCT No.: PCT/EP2007/050512
§ 371 (c)(1),
(2), (4) Date: Jul. 17, 2008

(87) PCT Pub. No.: WO2007/082919
PCT Pub. Date: Jul. 26, 2007

(65) Prior Publication Data
US 2008/0318047 A1 Dec. 25, 2008

Related U.S. Application Data

(60) Provisional application No. 60/759,585, filed on Jan. 18, 2006.

(51) Int. Cl.
*B01F 3/12* (2006.01)
*C01G 23/00* (2006.01)

(52) U.S. Cl. ............. 423/69; 423/82; 516/20; 516/33; 502/506; 502/509

(58) Field of Classification Search .......... 428/403–407; 516/20, 31, 33; 423/69, 82; 502/506, 509
See application file for complete search history.

(56) References Cited

U.S. PATENT DOCUMENTS

| | | | | |
|---|---|---|---|---|
| 2,448,683 | A * | 9/1948 | Peterson | 423/616 |
| 5,049,309 | A * | 9/1991 | Sakamoto et al. | 516/90 |
| 5,198,479 | A | 3/1993 | Shiobara et al. | |
| 6,291,070 | B1 | 9/2001 | Arparc et al. | |
| 6,358,601 | B1 | 3/2002 | Bilkadi | |
| 6,432,526 | B1 | 8/2002 | Arney et al. | |
| 6,547,870 | B1 * | 4/2003 | Griessmann et al. | 106/417 |
| 6,717,362 | B1 | 4/2004 | Lee et al. | |
| 7,303,821 | B1 * | 12/2007 | Huang | 428/446 |
| 7,575,731 | B2 | 8/2009 | Iijima et al. | |
| 7,579,081 | B2 * | 8/2009 | Brown | 428/405 |
| 2005/0154086 | A1 | 7/2005 | Yoneyama | |
| 2005/0253130 | A1 | 11/2005 | Tsutsumi et al. | |
| 2006/0147674 | A1 | 7/2006 | Walker, Jr. et al. | |
| 2008/0026210 | A1 * | 1/2008 | Iijima et al. | 428/338 |
| 2008/0081264 | A1 | 4/2008 | Mennig et al. | |

FOREIGN PATENT DOCUMENTS

| | | | |
|---|---|---|---|
| EP | 1538682 | A | 6/2005 |
| EP | 1591490 | A | 11/2005 |
| EP | 1775120 | A1 | 4/2007 |
| WO | 9902611 | A | 1/1999 |
| WO | 136529 | A | 5/2001 |
| WO | 0219440 | A | 3/2002 |
| WO | 2005067524 | A | 7/2005 |
| WO | 2006001487 | A1 | 1/2006 |
| WO | 2006007286 | A1 | 1/2006 |
| WO | 2006060141 | A2 | 6/2006 |
| WO | 2006066856 | A | 6/2006 |
| WO | 2008064070 | A1 | 5/2008 |

OTHER PUBLICATIONS

Ismagilov et al, Synthesis and stabilization of nano-sized titanium dioxide, Russin Chem. Rev. 78 (9) 873-885 (2009).*
Preparation of covalently modified organic-inorganic composite nanoparticles and their interfacialelectron transfer researches, Zhang, thin Solid Films 327-329 (1998) 563-567.
High-refractive-index thin films prepared from trialkoxysilane-capped poly(methyl methacrylate)-Titania Materials, Lee, Chem. Mater. 2001, 13, 1137-1142.
Reactive polymers: a versatile toolbox for the immobilization of functional meluculles on $TiO^2$ nanoparticles, Tahir, Angew. Chem. Int. Ed. 2006, 45, 908-912.
Surface modification of inorganic oxide particles with silane coupling agent and organic dyes, Lin, Polym. Adv. Technol. 12, 285-292 (2001) DOI:10.1002/pat.064.
Polymer-$TiO^2$ nanocomposites: a route towards visually transparent broadband uv filters and high refractive index materials, Nussbaumer, Macromol. Mater. Eng. 2003, 288, 44-49.
Surface-initiated polymerization from $TiO^2$ nanoparticle surface throught a biiomimetic initiator: a new route toward polymer-matrix nanocomposites, Fan, Elsevier,Composites Science and Technology 66 (2006) 1198-1204.
Polymer nanocomposites: from fundamental research to specific applications, Fisher, Elsevier Materials Science and Engineering, C23 (2003) 763-772.
Tailoring the surface and solubility properties of Nanocrystalline titania by a nonaqueous in situ funcionalization process, Niederberger, chem Mater. 2004, 16, 1202-1208.
International Search Report and Written Opinion of PCT/EP2007/050512, 2008. Tageto Tagutsi et al, Formation of new crystal faces on TiO2 particles by treatment with aqueous HF solution or hot sulfuric acid. New J. Chem., 2003.
Brian L. Bisschoff et al, Peptization Process in the Sol-Gel Preparation of Porous Anatase (TiO2), chem. mater. 1995.

* cited by examiner

*Primary Examiner* — Hoa (Holly) Le
(74) *Attorney, Agent, or Firm* — Coraline J. Haitjema; David P. Owen; Hoyng Monegier LLP

(57) ABSTRACT

Monomelic materials are described, comprising inorganic nanoparticles having covalently bonded to their surface at least one polymerizable organic moiety, preferably an ethylenically unsaturated organic moiety. These monomeric materials combine desirable properties of the inorganic particulate material and of the organic monomer, in addition to having the unique properties of nano-sized particles.

15 Claims, No Drawings

METHOD OF MAKING HYBRID ORGANIC-INORGANIC MONOMERIC MATERIALS

BACKGROUND OF THE INVENTION

1. Field of the Invention

The present invention relates to novel monomeric materials, and polymeric materials comprising the novel monomeric materials.

2. Description of the Related Art

Composite materials comprising inorganic particles and polymeric resins are known. In particular the so-called "hybrid organic-inorganic nanocomposites" are under active investigation. Their preparation involves attaching organic moieties to the surface of inorganic nanoparticles. This may be accomplished either by grafting organic moieties to pre-formed nanoparticles (referred to as post-synthesis modification), or introduction of the organic moiety during the nanoparticle synthesis (in situ modification).

Niederberger et al., Chem. Mater. 2004, 16, 1202-1208, describe a process for in situ modification of the surface of titania particles. The process involves the addition of titanium tetrachloride to a mixture of benzyl alcohol and dopamine or 4-tert-butylcatechol. The functionalized particles are soluble in various solvents, and suitable for convenient measurement of physical properties such as band gap energies.

Tahir et al., Angew. Chem. Imt. Ed. 2006, 45, 908-912 disclose an active polymeric ester that can be used for both in situ and post-synthesis functionalization. For the in situ functionalization of titania nanocrystals, TiCl4 was injected into a solution of the polymeric ligand in benzyl alcohol. The solution was stirred for two days at 80° C. under argon atmosphere. Post-functionalization was achieved by sealing a mixture of $TiO_2$ nanowires and 10 mL of polymeric ligand in benzyl alcohol.

Lee et al., Chem. Mater. 2001, 13, 1137-1142 disclose a hybrid optical thin film material comprising trialkoxysilane-capped PMMA (poly(methyl methacrylate)-titania. The material has a high refractive index. The material was prepared by polymerizing methyl methacrylate (MMA) and 3-(trimethoxysilylpropyl methacrylate (MSMA) in the presence of benzoyl peroxide (BPO) as an initiator. After two hours polymerization at 60° C. a homogenous solution in tetrahydrofuran (THF) of deionized water and Ti(OBu)4 was added dropwise. The mixture was reacted for another 2 hours at 60° C.

The materials of the prior art are either surface modified inorganic nanoparticles, or dispersions of inorganic nanoparticles in an organic resin.

It is an object of the present invention to provide monomeric materials comprising inorganic nanoparticles having covalently bonded to their surface at least one ethylenically unsaturated organic moiety.

It is a further object of this invention to provide homopolymers of the novel monomers of the present invention.

It is yet another object of the present invention to provide heteropolymers comprising, as a first monomer, a monomer of the present invention and, as a second monomer, a conventional organic monomer.

It is a further object of the present invention to provide a process for preparing the hybrid monomers of the present invention.

BRIEF SUMMARY OF THE INVENTION

In a first embodiment, this invention is to a hybrid organic-inorganic monomeric material comprising inorganic nanoparticles having covalently bonded to their surface at least one polymerizable moiety, preferably an ethylenically unsaturated organic moiety.

In a second embodiment, this invention relates to a polymeric material comprising the hybrid organic-inorganic material of the first embodiment. The polymeric material can be a homopolymer of the hybrid monomeric material, or it can be a heteropolymer of the hybrid monomer and a conventional organic monomer.

In a third embodiment, this invention relates to a method for preparing a hybrid organic-inorganic monomeric material comprising the steps of:

a) peptizing an inorganic particulate material in an inorganic acid to provide a solution of the inorganic particulate material;

b) fractionating the solution obtained in step a) to provide a solution of inorganic particles having a particle size range of 5 nm to 100 nm;

c) mixing the fractionated solution obtained in step b) with an organic solvent S1;

d) reacting the mixture of step c) with a solution in an organic solvent S2 of a reactive silane-functional organic monomer.

Not every inorganic material lends itself to be formed into nano-sized particles or is suitable for use in the present invention. Suitable examples include the oxides, sulfides, sulfates, phosphates, arsenides, arsenates, of non-noble metals, which can be covalently functionalized at the particle surface with a reactive moiety The inorganic particles may be amorphous, or they may be crystalline. In many cases crystalline materials are preferred, because these materials have more pronounced physical properties than do amorphous materials.

It has been found that the materials of the invention are particularly suitable for preparing polymeric resins having excellent optical properties in terms of transparency and refractive index. In this context, preferred inorganic materials are those having a high refractive index, i.e., a refractive index of at least 2. Suitable examples include titanium dioxide, zinc oxide, zinc sulfide, lead sulfide, and the like. In this context titanium oxide is a preferred material, in particular the crystalline forms anatase and rutile.

The term "refractive index" or "RI", as used herein, refers to the refractive index of a material at the wavelength of light emitted by sodium (589 nm).

In the monomers of the present invention, conventional organic monomers are bonded to the surface of the inorganic particles via a covalent bond. Preferably this covalent bond is a bond of a silicon atom with the surface of the inorganic particle. This bond is created by reacting the inorganic particle with a reactive silane functional monomer. Preferred are monomers having an ethylenically unsaturated double bond.

The reaction of the inorganic particle with the reactive silane functional monomer may be accomplished by reacting the reactive silane functional monomer with a pre-formed inorganic particle (post-synthesis), or by creating the inorganic particle in the presence of the reactive silane functional monomer (in situ). The post-synthesis reaction is preferred.

The hybrid inorganic-organic monomers of the present invention are of particular interest as building blocks of hybrid inorganic-organic polymers. For the purpose of polymerization reactions the hybrid monomers have the properties of the organic monomer from which they were derived, and polymers may be formed using reaction conditions, polymerization catalysts, polymerization initiators and cross-linking agents familiar to those skilled in the art.

The hybrid monomers may be reacted with themselves, to form homopolymers, or they may be reacted with other monomers, to form heteropolymers. Heteropolymers may have the respective monomers randomly distributed therein, or they may be in the form of so-called block copolymers, that is, the resulting polymer chains comprise oligomeric segments of homopolymeric nature.

The resulting polymer resins, in particular the transparent ones, are believed to form a novel class of compounds, for which the inventors propose the generic name naptomer, to reflect their dual character of nano-sized particles and of polymeric materials. A specific subclass of naptomer materials is formed by materials that are based on crystalline inorganic particles. For this subclass of materials the inventors propose the name crystamer. Another important subclass of materials are those that have desirable optical properties; for this subclass the inventors propose the name optopoly. It will be understood that optopoly materials may or may not belong to the subclass of crystamer materials.

DETAILED DESCRIPTION OF THE INVENTION

The invention will be further illustrated by a detailed description of the preparation of a titania-based crystamer material having attractive optical properties, including a high degree of transparency and a high refractive index. It will be appreciated that the illustrated process may be modified by using a different inorganic starting material, by using a different reactive silane functional monomer, by using different solvents, etc.

The preferred titania starting material is one of the commercially available titanias sold as having a crystallite size in the nanometer range. However, such materials generally include particles that are significantly larger than the manufacturer's specifications indicate, presumably as a result of agglomeration. It is further believed that amorphous material is formed during the manufacturing processes of these titania materials, which binds the nano-sized titania crystals in the material.

To form naptomers, it is generally necessary to dis-agglomerate the titania starting material by dissolving it in a strong acid. The acid should be strong enough to not only peptize the particles, but to also dissolve amorphous titania that binds nano-crystals together. It is possible that the treatment with the strong acid also causes a certain amount of recrystallization of the nanocrystalline particles.

In the case of titania, very few acids are strong enough to meet the above requirements. Suitable acids include fluoric acid and anhydrous sulfuric acid, anhydrous sulfuric acid being preferred.

The titania material is mixed with concentrated sulfuric acid, and the mixture is heated to about 200° C. This temperature is maintained for about 5 minutes. The solution is then cooled to room temperature, preferably with the aid of an ice bath. The cooled solution is mixed with water. The resulting suspension is filtered through a series of filter media of decreasing pore size to remove micrometer-size particles. A clear solution is obtained.

This clear solution is subjected to dialysis, to remove sulfate anions, dissolved Ti4+ cations and $TiO_2$ particles smaller than 5 nm. Preferably the dialysis removes all $TiO_2$ particles smaller than 15 nm. During dialysis the pH is kept at about 1, using 0.1 N aqueous HCl.

The dialyzed solution is reduced to one third of its volume by evaporation of most of the water present in the solution. After evaporation the TiO2-concentration is preferably around 5 g per 100 ml. At this point concentrated HCl is added to form a 3 molar solution.

The acidified solution is then mixed with an organic solvent S1. This solvent must be miscible with water, and also be an appropriate solvent for the reactive silane functional monomer. In this example N,N-dimethylacetamide (DMAC) is used. In general, the acidified aqueous solution is diluted 2-6 times with the organic solvent.

The DMAC solution of the titania nano-particles is mixed with 3-(trimethoxysilyl)propyl methacrylate (CAS Number 2530-85-0) in DMAC. The reaction temperature is 80° C., and the reaction time about 1 hour. An ultrasonic bath is used to facilitate what is in essence a heterogeneous reaction, even though it takes place in a clear solution.

After the silanation reaction is completed, water is added to the reaction product, forcing the silanated titania particles out of solution. The resulting suspension is centrifuged for 10 minutes at 5,000 rpm. The resulting pellet is dissolved in DMAC, and the solution is evaporated to remove any remaining water. The silanated particles also form clear solutions with other solvents, such as N,N-dimethylformamide (DMF) and acetonitrile, and with monomers such as N,N-dimethylacrylamide. Other suitable monomers include N,N-dimethylmethacrylamide, and mixtures of this acrylamide and the corresponding methacrylamide.

Optionally, the solubility may be further improved by stirring a solution of silanated particles in DMF with trioctylphosphine oxide (TOPO, CAS Number 78-50-2), 5 wt % with respect to $TiO^2$. The nanoparticles may be further stabilized with reactive polymers, such as the oligomers and polymers of the above-mentioned acrylamide and methacrylamide monomers.

For the polymerization reaction the silanated particles are dissolved in a suitable monomer. The centrifuge pellet may be directly dissolved in the monomer, or it may first be dissolved in a non-monomeric solvent, such as DMAC. In the latter case, the solution is subsequently mixed with the selected monomer, and the solvent is then removed, for example by evaporation. It is important that, at the start of the polymerization reaction, the monomer mixture be essentially solvent-free.

A solution of the silanated particles in N,N-dimethylacrylamide is polymerized by adding a photo-initiator (Darocur 4265, Ciba-Geigy), or thermally with azobisisobutyronitrile (AIBN) or another radical initiator. A viscous, clear solution is formed, which hardens to a plastic resin when radiated with UV radiation.

Resins of N,N-dimethylacrylamide and methacrylate modified titania nanoparticles have excellent optical properties in terms of transparency and a high refractive index. For optimum refractive index results, crystalline titania particles are preferred over amorphous particles, and rutile particles are preferred over anatase particles.

The particle size of the peptized particles may be determined by atomic force microscopy (AFM). It is believed that particles smaller than about 20 nm contribute less to the high refractive index of the resin (see W. Caseri, Macromol. Rapid. Commun. 21, 705-722 (2000)). Therefore, the monomer preferably does not contain significant quantities of titania particles below 20 nm in size.

Titania particles having a size significantly larger than 20 nm are not preferred in optical resins, because such particles cause light absorption and Raleigh scattering. It has been found that the process described above results in a solution of titania particles that are virtually free of titania crystallites larger than 20 nm. This is surprising, as the final filtration step is carried out with a filter medium having a pore size of 0.2 micrometers (200 nm). On average about 10% of the original amount of titania is retained on the filter paper.

The dialysis step serves to remove dissolved ions ($Ti^{4+}$ and $SO_4^{2-}$), and titania particles smaller than about 5 nm. Good results are obtained with a Spectra/Por type 7 dialysis tube available from Spectrum in Gardenia, Calif. USA. The dialysis may be optimized further by selecting a medium that removes substantially all titania particles smaller than 10 nm, preferably substantially all titania particles smaller than 15 nm are removed.

The refractive index of an optical resin prepared by the above-described process is a function of the volume percentage of titania particles present in the resin. The resins of the present invention may contain as much as 50 vol. % titania, which corresponds to about 80 wt %.

The high degree of transparency and the high refractive index of the optical resins of this invention make these materials particularly suited for a large number of optical uses, such as lenses, refractometers, and the like. An application of particular interest is the use of these resins for encapsulating light-emitting diode (LED) chips.

At the interface of two optical materials with different refractive indices two types of reflection may occur. The first is the well-known complete reflection, which occurs if the angle of the incident beam is outside the so-called Snellius cone. This type of reflection may be referred to as the classical, or Snellius, reflection. In addition there is a second form of reflection, which occurs within the Snellius cone. This is a partial reflection, which is proportional to the ratio of the squares of the respective refractive indices.

Owing to the semiconductor materials used in LED chips, these chips or dies have a very high refractive index: typically around 2.2 for green and blue LEDs, and around 3.4 for red LEDs. The methods of manufacture of these chips inevitably results in LEDs having a flat surface at the light emitting side. The flat surface in interface with the surrounding air causes much of the light emitted from the LED to be reflected back into the LED chip. Put differently, the LED/air interface has a small Snellius cone, resulting in a poor light emission efficiency.

Standard LEDs are encapsulated in a hemisphere of a transparent resin. The spherical resin-air interface results in a much lower reflection. However, the refractive index of the materials used for these glob tops is typically around 1.5, resulting in a significant drop in refractive index at the flat LED/dome interface. As a result, the encapsulation results in only a modest reduction of the loss of light yield due to reflection.

The optical resins of the present invention can be formulated to possess very high refractive indices. For example, a resin comprising 50 vol. % PbS (RI=4.0) in an organic matrix having RI=1.5 has a refractive index of 2.75. Titania-based resins can be formulated to a RI of up to about 2.2. The rheological properties of these materials make it feasible to form them into the desired spherical shape. The Snellius reflection of such assemblies is much reduced.

Although LED domes made of optical resins with a high RI significantly reduce the reflection loss at the LED/dome interface, some of the gain is negated by an increased partial reflection at the dome/air interface. This is due to the high drop in RI at this latter interface. It has now been found that reflection losses can be further reduced by providing dome layers of decreasing RI, even though by this measure the number of reflecting surfaces is increased.

For a green or a blue LED, having a RI of 2.2, the optimum encapsulation assembly comprises a dome-shaped core having a RI of 2.2 (i.e., identical of that of the LED chip), a first hemi-spherical shell having a RI of 1.81, and a second semi-spherical shell having a RI of 1.22. This layered dome has a reflection loss of 3.8%, compared to a reflection loss of 14% for a monolithic dome having a RI of 2.2. Much of the gain is already obtained with a material having a RI of at least 2.

The light efficiency gain obtained with this layered dome stems from the fact that the partial reflection is proportional to the ratio of the squares of the respective refractive indices.

Resins having reflective indices of 2.2 and 1.81 can be formulated using the process described hereinabove. Transparent resins having a RI of about 1.22 are at present not available. The best practical option available is using for the outer shell a resin having a RI of about 1.3 to 1.4, which resins are known in the art.

The same core/shell/shell design encapsulation assembly can be used for encapsulating a red LED, having a RI of 3.4. Although not optimal for this configuration (the RI of the dome is significantly lower than that of the LED chip), the reduction in reflection loss is nevertheless substantial (30%).

What is claimed is:

1. A method for preparing a hybrid organic-inorganic monomeric material comprising the steps of:
   a) peptizing an inorganic particulate material, the inorganic particulate material selected from the oxides, sulfides, sulfates, phosphates, arsenides, and arsenates, of non-noble metals, and mixtures thereof, in an inorganic acid to provide a solution of the inorganic particulate material;
   b) fractionating the solution obtained in step a) to provide a solution of inorganic particles having a particle size range of 5 nm to 100 nm;
   c) mixing the fractionated solution obtained in step b) with water miscible, organic solvent S1;
   d) reacting the mixture of step c) with a solution in an organic solvent S2 of a reactive silane-functional organic monomer.

2. The method of claim 1 wherein solvent S1 is identical to solvent S2.

3. The method of claim 1 wherein the inorganic material is selected from materials having a refractive index of at least 2.0.

4. The method of claim 1 wherein the inorganic material is selected from the group consisting of titanium dioxide, zinc oxide, zinc sulfide, lead sulfide, and mixtures thereof.

5. The method of claim 4 wherein the inorganic material is titanium dioxide.

6. The method of claim 5 wherein the titanium dioxide is anatase, rutile, or a mixture thereof.

7. The method of claim 6 wherein the titanium dioxide is rutile.

8. The method of claim 1 wherein the inorganic acid in step a) is anhydrous sulfuric acid or hydrogen fluoride.

9. The method of claim 1 wherein step b) comprises filtration.

10. The method of claim 1 wherein step b) comprises dialysis.

11. The method of claim 1 wherein the solution obtained in step b) contains inorganic particles having a particle size of 15 to 50 nm.

12. The method of claim 11 wherein the solution obtained in step b) contains inorganic particles having a particle size of about 20 nm.

13. The method of claim 1 wherein solvent S1 is selected from the group consisting of N,N-dimethylacetamide, N,N-dimethylformamide (DMF), and acetonitrile.

14. The method of claim 1 wherein the reactive silane-functional organic monomer comprises an ethylenically unsaturated moiety.

15. The method of claim 14 wherein the reactive silane-functional organic monomer comprises an acrylamide or a methacrylamide moiety.

* * * * *